United States Patent

[11] 3,609,525

[72] Inventors William R. Clingenpeel
Middleburg Heights;
Philip C. Hungerford, Jr., Cleveland;
Robert R. Hayes, Euclid; Thomas W.
Jennens, Eastlake, all of Ohio
[21] Appl. No. 28,226
[22] Filed Apr. 16, 1970
[45] Patented Sept. 28, 1971
[73] Assignee ESB Incorporated
Philadelphia, Pa.
Continuation of application Ser. No.
643,631, June 5, 1967, now abandoned.

[54] MACHINE USED IN ELECTRICALLY TESTING BATTERY INTERCELL CONNECTORS AND TERMINAL POSTS
19 Claims, 17 Drawing Figs.
[52] U.S. Cl. .................................................. 324/29.5
[51] Int. Cl. .................................................. G01n 27/42
[50] Field of Search .......................................... 324/29.5,
149, 158 P, 73 R, 51, 52, 62 R, 65 CP, 71 R;
320/48

[56] References Cited
UNITED STATES PATENTS
2,093,429  9/1937  Foss ............................. 209/81 X
2,149,686  3/1939  Rivenburgh ................. 324/65 CV
3,017,570  1/1962  Floyd .......................... 324/29.5
3,185,927  5/1965  Margulis et al. ............. 324/158 P
3,236,374  2/1966  Zimmerman et al. ......... 324/73 AT Primary Examiner—Rudolph V. Rolinec
Assistant Examiner—R. J. Corcoran
Attorneys—Alfred J. Snyder, Jr., Robert H. Robinson and Raymond L. Balfour ABSTRACT: A machine used in electrically testing battery intercell connectors and terminal posts. The machine includes electrical probes which, when used with appropriate electrical test circuits, can determine whether the connectors and posts are properly constructed and connected to the cell element.

MACHINE USED IN ELECTRICALLY TESTING BATTERY INTERCELL CONNECTORS AND TERMINAL POSTS

"This is a continuation of Application Serial No. 643,631, filed June 5, 1967, and now abandoned."

BACKGROUND OF THE INVENTION

Automotive and other multicell storage batteries have as essential components both intercell connectors and terminal posts which usually are affixed to, and project up from, the connecting straps which electrically connect the positive and negative plates. The intercell connectors and terminal posts may be integrally cast with the connecting straps, may be cast onto the straps so as to fuse to the straps, or may be precast and later fused to the connecting straps. However affixed to the connecting straps the intercell connectors and terminal posts should make good electrical contact with the connecting straps.

SUMMARY OF THE INVENTION

This invention provides a machine having electrical probes which, when used with appropriate electrical test circuits, can determine whether the intercell connectors and terminal posts are properly constructed and connected to the cell element. While the machine to be described in detail is similar in construction to the machine which is described in the related application and which casts intercell connectors and terminal posts onto the connecting straps, this machine may be used to test electrically the connection of the connectors and posts with the straps regardless of how that connection has been achieved. This machine is independent of the electrical test circuit used to determine the adequacy of the electrical connections, for a variety of such circuits could be employed with this machine; a typical test circuit would measure the actual magnitude of some electrical characteristic such as current flow or voltage drop through or across the machine's probes, and then compare the measured value with a preselected standard.

BRIEF DESCRIPTION OF THE DRAWINGS

FIG. 14 is a top view of a six cell automobile battery before the cover is placed on.

DESCRIPTION OF THE PREFERRED EMBODIMENT

Before beginning a discussion of the machine which is the subject of this application, it is in order to give a brief description of a typical battery on which the machine might perform its operations.

Figure 14:
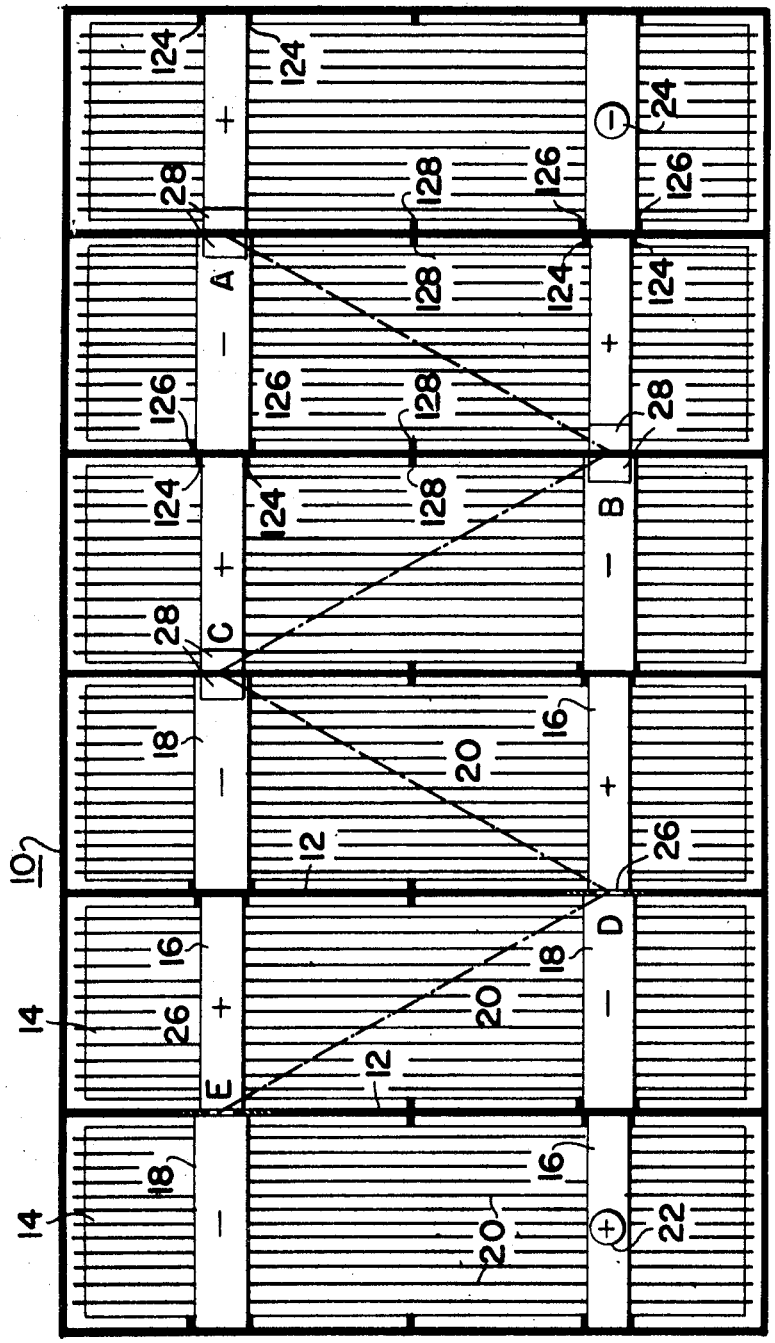
Figure 15:
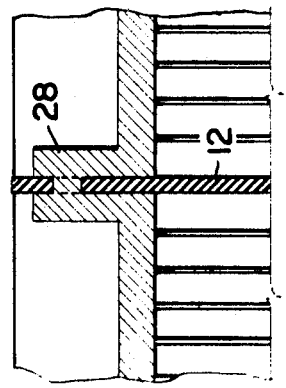
FIG. 15 is a sectional elevation showing an intercell connector extending through the partition.
Figures 16, 17:
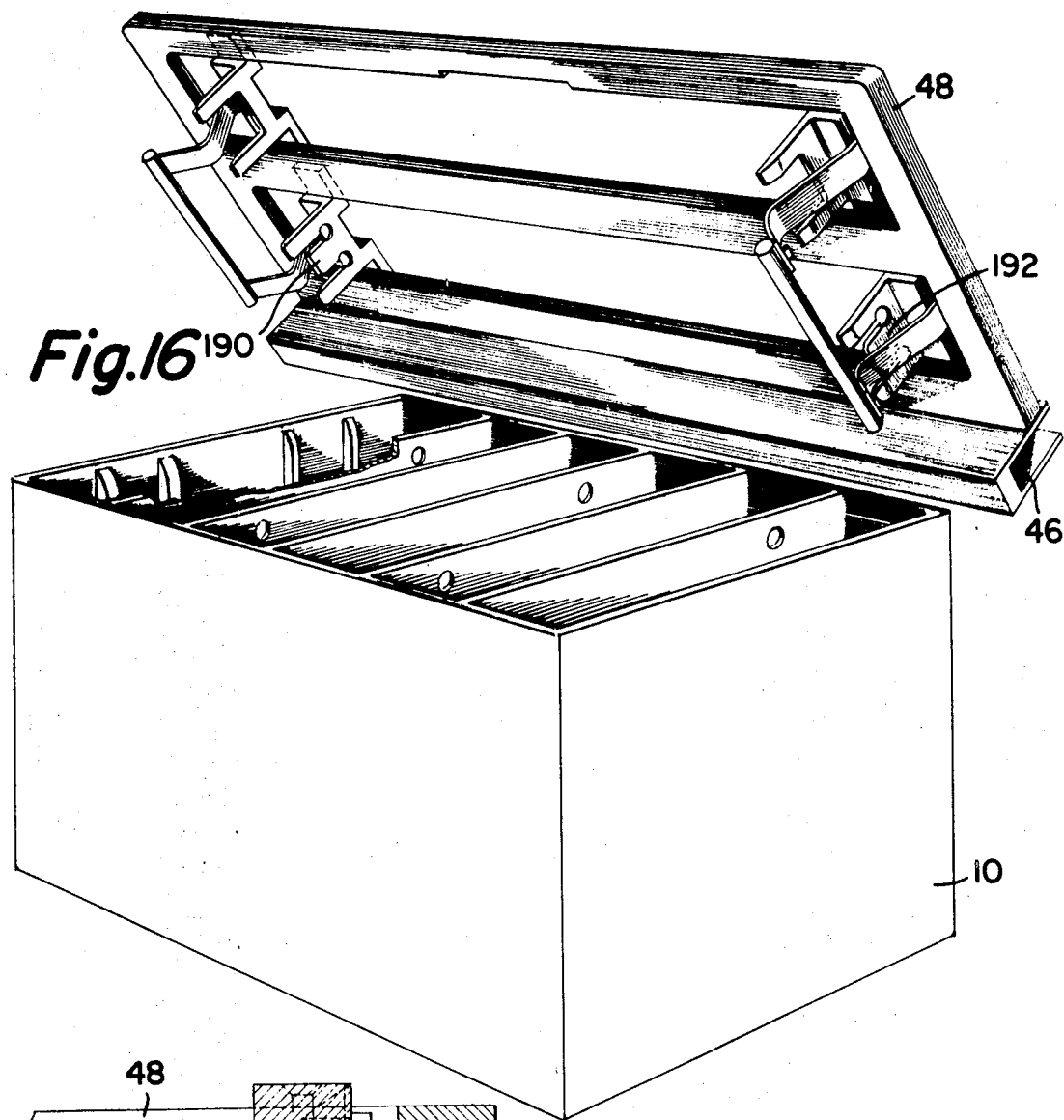
FIG. 16 is an oblique view of the battery and its accompanying jig plate.
FIG. 17 is a sectioned elevation showing how the jig plate engages the end of the battery container.

FIG. 14 shows a six cell automobile battery after the terminal posts and intercell connectors are constructed but before the cover of the batter is applied. The drawing shows a container 10 having partitions 12 which divide the space inside the container into six compartments 14. Inside each compartment is a series of negative and positive plates, alternatively spaced and separated from one another by suitable separators. Extending across the compartments and electrically connecting all positive plates with one another and all negative plates with one another are positive and negative connecting straps 16 and 18, respectively. Collectively the plates, separators, and connecting straps constitute cell elements 20. Inasmuch as all of this is typical of conventional battery construction, no elaborate explanation will be given, and the drawing shows the plates and separators schematically represented by lines. FIG. 14 also shows the positive terminal post 22 and negative terminal post 24 extending up from their respective connecting straps 16 18, as well as showing five intercell connectors 28 which electrically connect the six cell elements 20. FIG. 15 shows one of the intercell connectors extending through the partition, although it should be understood that the connector could go over rather than through the partition.

Figure 1:
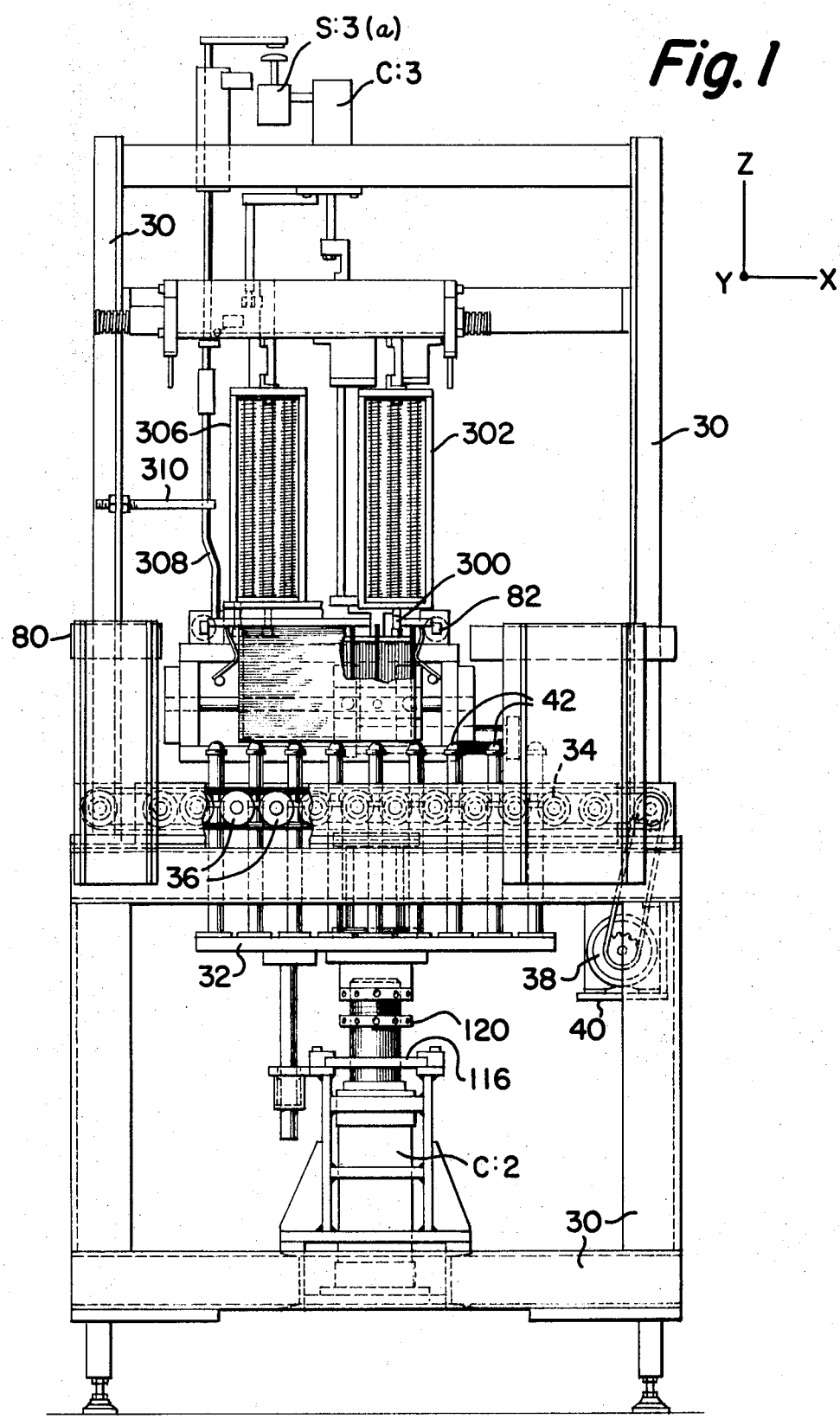
FIG. 1 is a front elevation of the machine with the battery in its fully elevated position.
Figure 2:
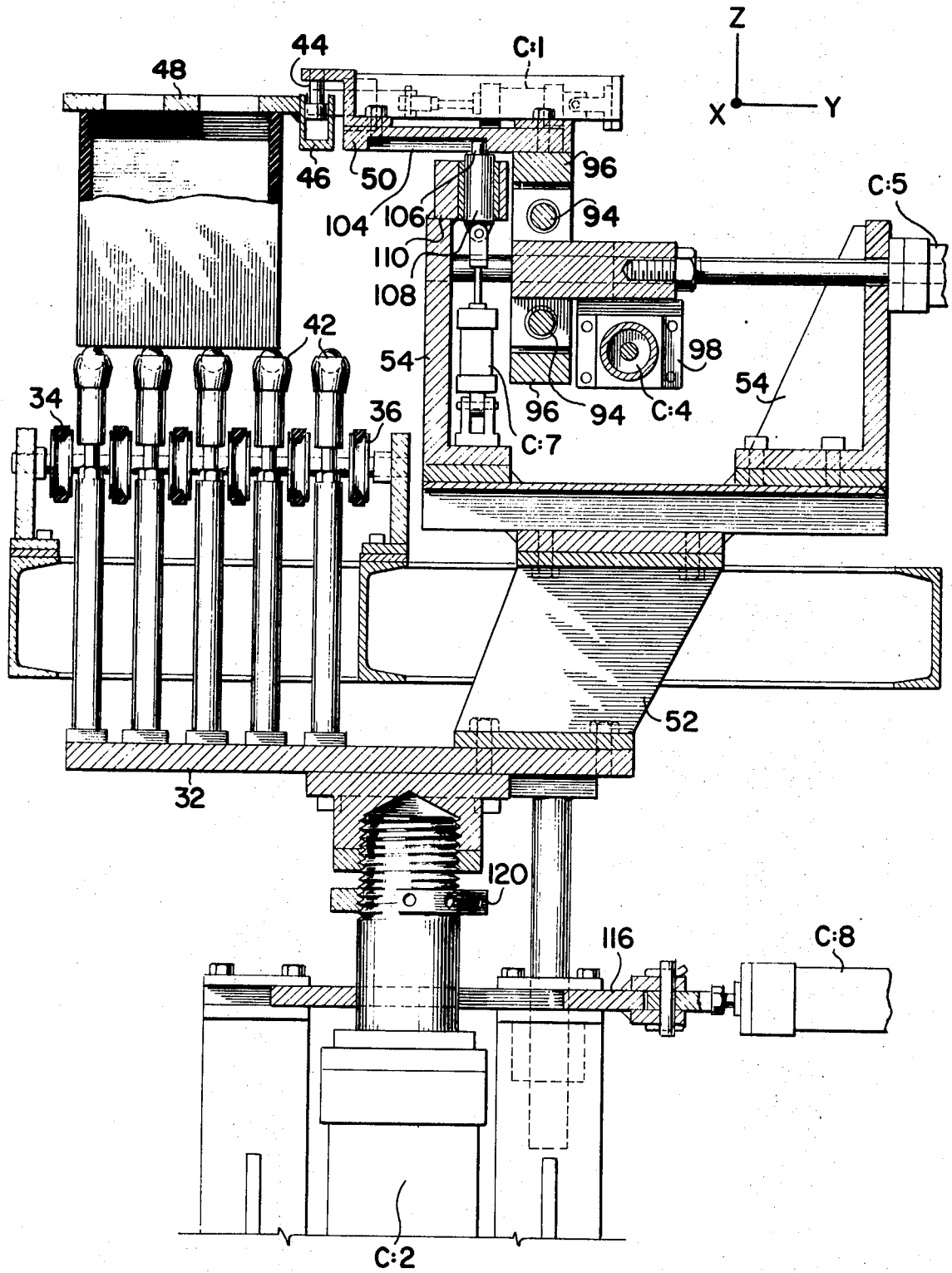
FIG. 2 is a side elevation of a portion of the machine, with portions removed, showing the battery in its fully elevated position.
Figure 3:
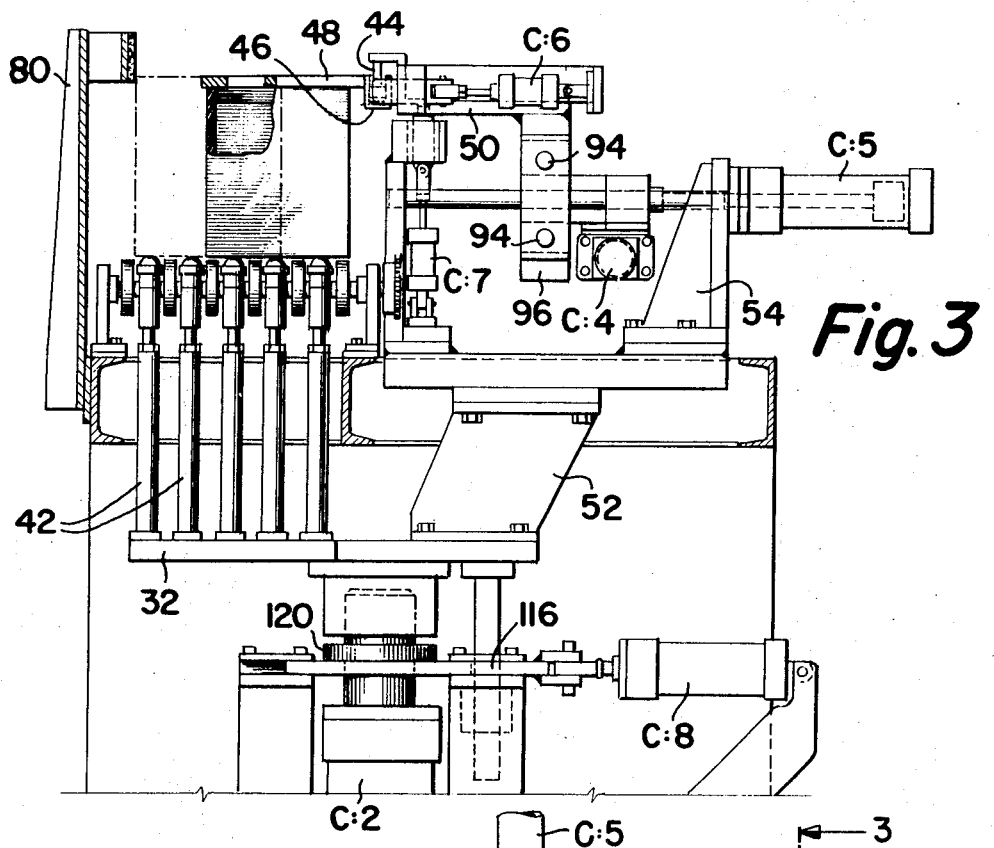
FIG. 3 is a side elevation of a portion of the machine showing the battery in a different vertical and horizontal position from FIG. 2.

Since the intercell connectors are situated inside the battery container, it is necessary either to move the battery to the test probes or, conversely, move the test probes to the battery. The machine shown in the drawings moves the battery to the probes, and in so doing requires movement along all three of the principle axes. For convenience, these axes are labeled "X,", "Y," and "Z," and are defined as shown in FIGS. 1 and 2.

The machine (FIGS. 1 and 4) includes a frame 30 on which the functional parts are mounted. At the bottom and near the center of the machine is a hydraulic or air cylinder C:2, to the vertical piston of which is mounted a table 32. Mounted in the frame 30 is a series of horizontally aligned belts 34 (FIGS. 1, 2, and 5) which move over pulleys 36 and which are driven by a combination electric motor and speed reducer mechanism 38 attached by a bracket 40 to the frame 30. These belts assist in moving the battery into the desired position for electrical testing and will normally constitute a segment of a longer conveyor system, the remaining portions of which lead to and from the machine and are not shown in the drawings.

To provide vertical movement to the battery, a series of risers 42 (FIGS. 1, 2, 3, and 5) are mounted on the table 32 and spaced between the belts 34 and their associated pulleys 36. The movements of the parts of the machine are programmed in such a manner that the piston of cylinder piston C:2, and consequently the risers 42, are lowered when the battery is being received, but afterward rise to elevate the battery to the proper level for electrical testing. To facilitate horizontal movement of the battery, each riser is provided at its top with a ball caster.

In addition to the vertical movement, the machine must also impart horizontal motion to the battery. Although with sufficient probes and test circuits the machine could test all intercell connectors simultaneously, the machine shown in the drawings tests only one intercell connector at a time, and in the process of testing all five intercell connectors will move the battery horizontally along the W-shaped path shown in FIG. 14 to facilitate later discussion, the five points of this letter "W" will be designated as points "A," "B," "C," "D," and "E." The horizontal motion is transmitted to the battery by cam followers 44 (FIGS. 2 and 3) which lock into position in the U-shaped channel 46 of a jig plate 48 fitting over the top of the battery, as shown in FIGS. 2 through 5 and FIG. 16. The cam followers 44 are rigidly secured to a horizontally movable cam plate 50 which is suspended above the table 32 by means of a support bracket 52, a U-shaped bracket 54, and other associated parts whose operation will be described in detail later.

Figure 6:
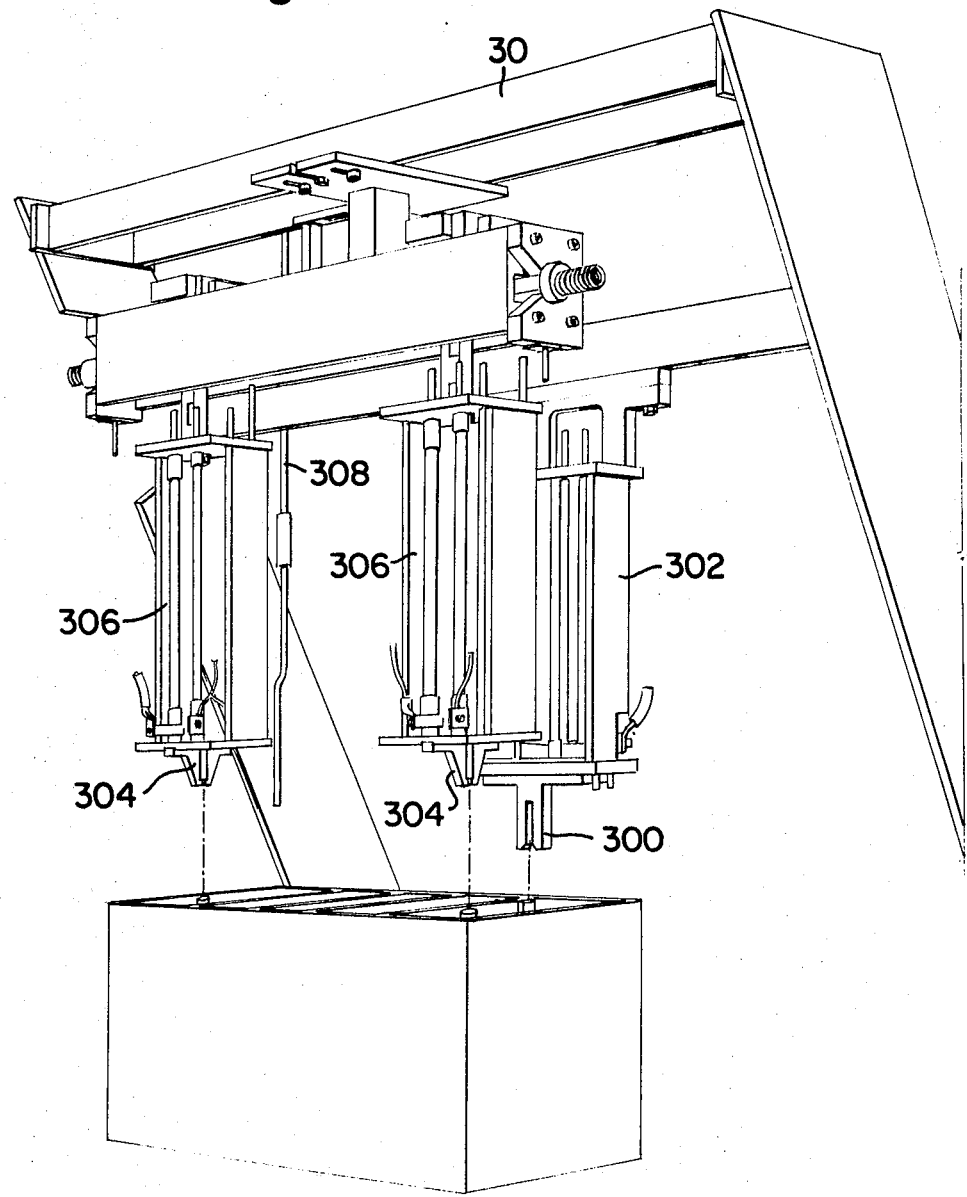
FIG. 6 is a perspective showing the probe assemblies used in testing the intercell connectors and terminal posts.
Figure 8:
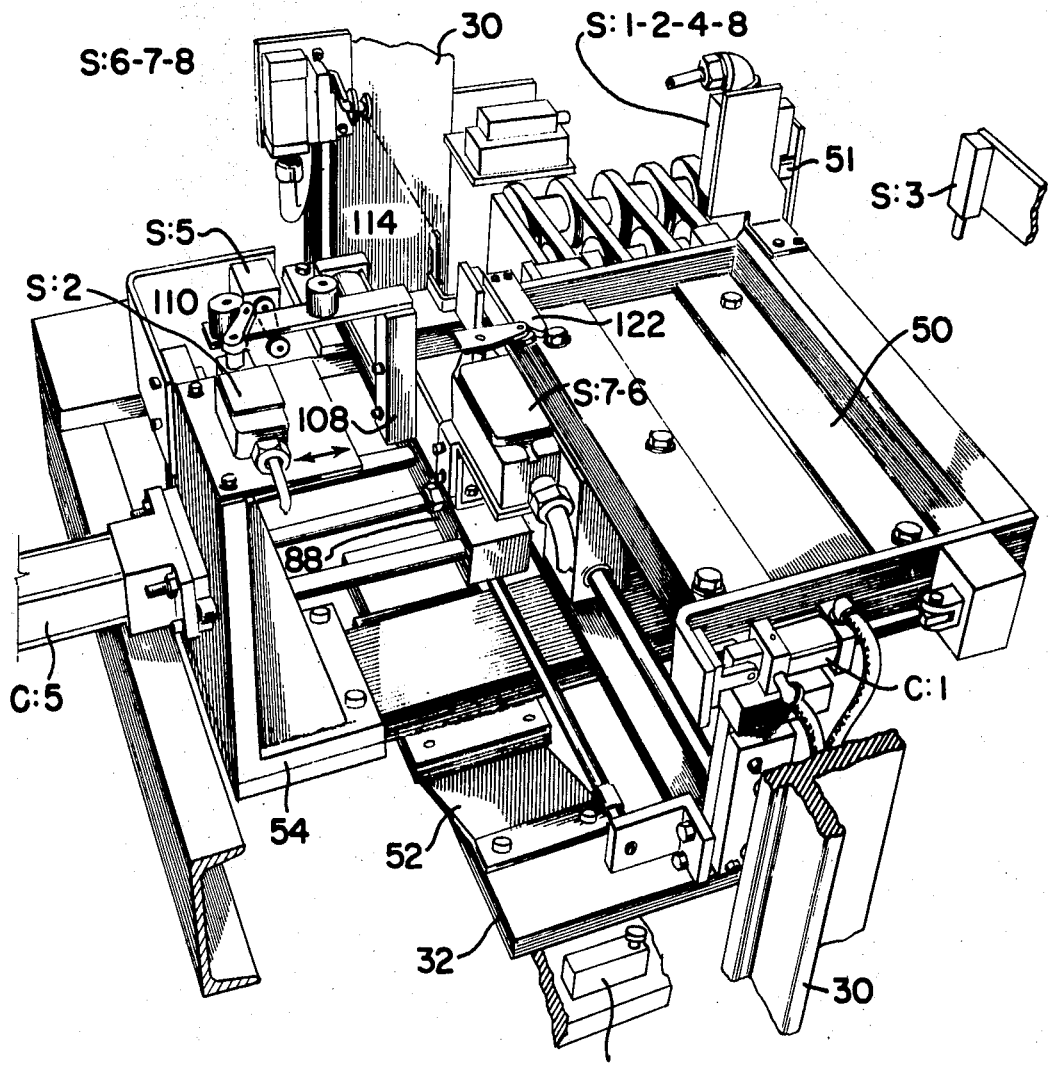
FIG. 8 is an oblique view showing various switches in the machine.

The intercell connector test probe assembly 300 is shown in FIG. 6 being suspended from the top of the frame 30 by means of a probe bracket 302. The probe assembly contains a pair of current passing probes and at least two probes used in determining the magnitude of the electrical characteristic measured by the rest circuit. Similarly, two terminal post probe assemblies 304 are suspended by probe bracket 306, as shown in FIG. 8.

Before describing the sequence of motions of the machine, it should be stated generally that these motions are produced by cylinders which are activated when associated switches are closed, tripped, or triggered. There must, of course, be some circuitry connecting the switches with the cylinders. Since these circuits may be electrical, air, or hydraulic and since numerous circuits accomplishing the same net result might be devised, no specific circuit diagram will be shown. Instead such terms as "triggering switch M causes cylinder M to function" or "cylinder M functions in response to the action of switch M" will be used, these terms being understood to imply that there is an appropriate circuit of some type between the switch and the cylinder.

Figure 4:
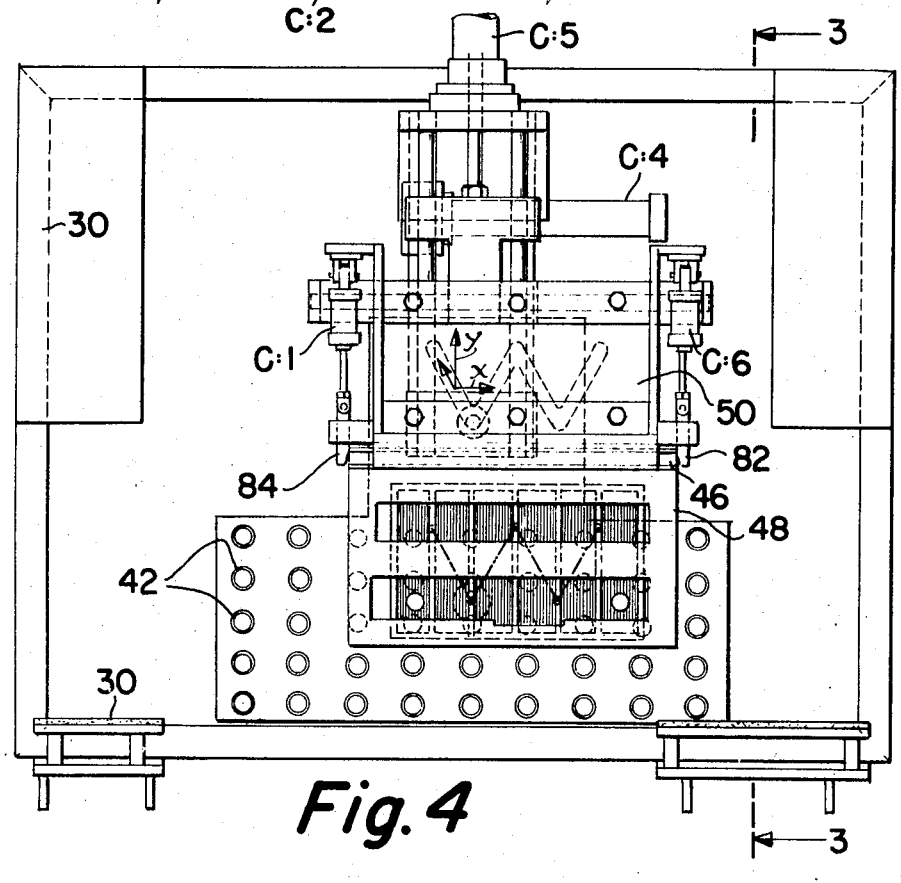
FIG. 4 is a plan view of the portion of the machine shown in FIG. 3.
Figure 5:
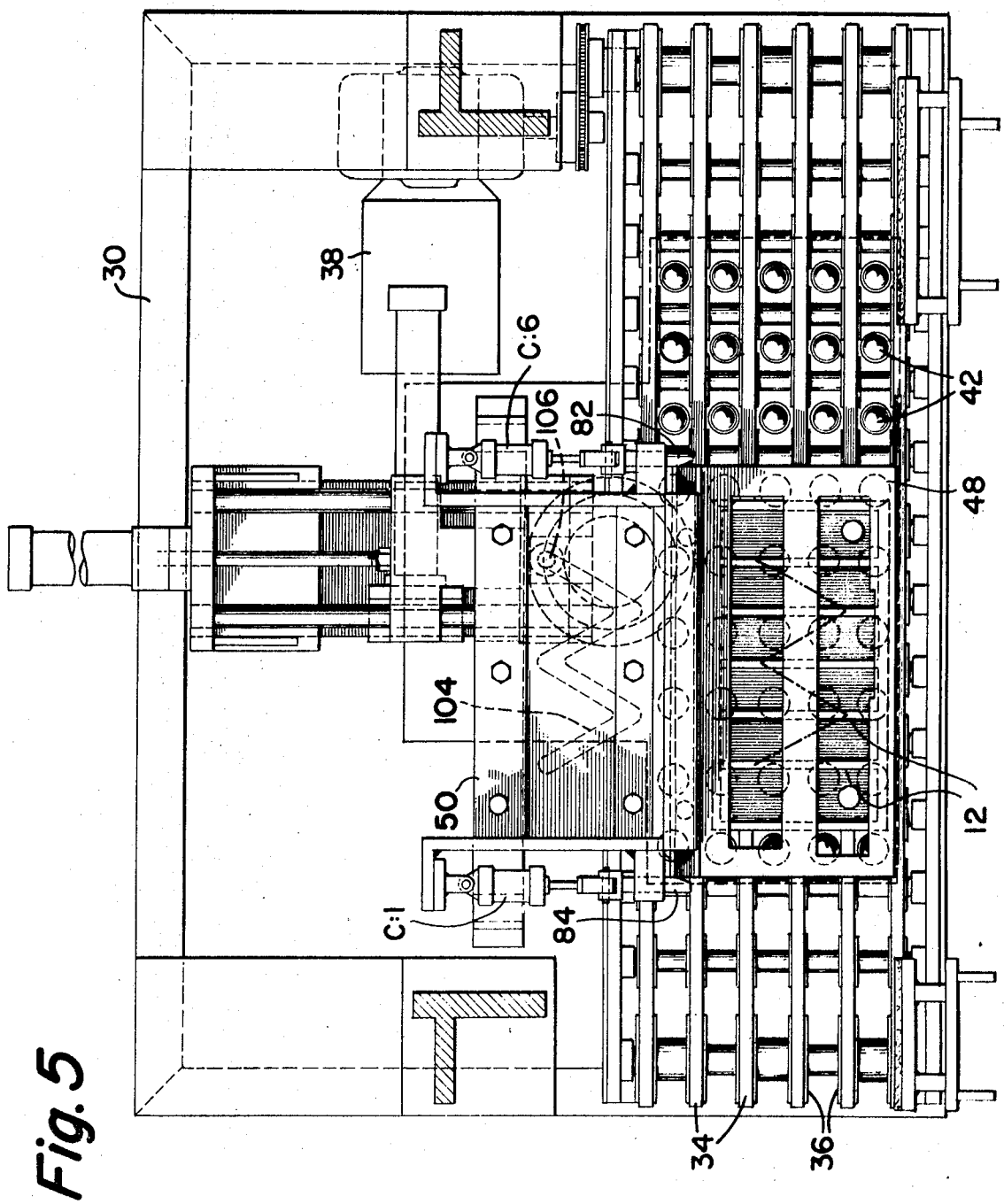
FIG. 5 is a sectioned plan view of the machine together with the battery and its accompanying jig plate, taken along the section line A-A shown in FIG. 2.

The sequence of motions of the machine will now be described, beginning with the time when the battery and accompanying jig plate roll onto the belts 34 and are deflected by the guide fence 80 (FIGS. 1 and 3) into the proper horizontal position so that the cam followers 44 fit into the U-shaped channel 46 of jig plate 48. The forward motion of the battery along the "X" axis will come to a halt when the jig plate 48 bumps into the outwardly projecting stop pin 82 (FIGS. 1, 4, and 5). Simultaneously the advancing battery triggers switch S: 1-2-4-8 (positioned above the cam plate 50 but having its actuator arm 51 extending downward below the cam plate to make contact with the jig plate on top of the battery, see FIG. 8), causing shot pin 84 (FIGS. 1, 4, and 5) to extend at the rear of the battery to lock the battery in place. Motion of shot pin 84 to produced by air cylinder C:1, which functions in response to the action of switch S: 1-2-4-8-, Switch S: 1-2-4-8, when triggered, also causes cylinder C:2 to function, raising the table 32, risers 42 and the battery upward. The battery is lifted so that the intercell connector at Position "A" (see FIG. 14) comes into engagement with the test probe assembly 300. If desired the probe assembly 300 may be spring loaded to assure good contact, and therefore good electrical connection, with the intercell connector. When the piston of cylinder C:2 approaches the top of its stroke, switch S:3 (suspended from the frame 30, see FIG. 8) is triggered by an arm 86 extending outward from bracket 54; when so triggered, switch S:3 causes a pulse or short duration current to be sent through the current passing probes in assembly 300 and intercell connector so that the electrical characteristic being employed in the test circuit can be measured and compared with the preselected standard to determine the suitability of nonsuitability of the intercell connector. If desired, the probe assembly 300 and the electrical test circuit may be so designed that the suitability of the fused bond between the intercell connector and the positive and negative connecting straps 16 and 18, respectively, may be determined separately from the suitability of that portion of the intercell connector extending through or over the partition; a series of measuring probes may be needed or used advantageously if such refinement is desired. The test circuit employed will typically include means for shutting off the machine being described and/or alerting an operator whenever an intercell connector is determined to be unacceptable.

As the battery rises at Position "A," an additional event occurs. The jig plate 48 placed on top of the rising battery comes in contact with the lower end of the rod 308 (FIG. 1) which extends up through the frame 30 and is guided by a bracket 310, causing the rod 308 to lift. The upper end of rod 308 is normally in engagement with a switch S:3 (a) is mounted on top of frame 30, but this engagement is broken and switch S:3 (a) is triggered, when the rod 308 is lifted. When triggered, switch S:3 (a) causes cylinder C:3 (positioned above frame 30, FIG. 1) to function and lower the terminal post test probe assemblies 304 and probe bracket 306 to make contact with the terminal posts and the respective connecting straps to which they are connected. Pulses or short duration currents sent through the two probes can be used to determine the suitability of the positive and negative terminal post castings and of their bond with their respective connecting straps.

Either switch S:3 or S:3 (a) may in addition be used to trigger a remotely located timing mechanism which regulates the time during which cylinders C:2 and C:3 are functioning; at the end of this time, cylinder C:3 lifts the terminal post test probe assemblies 304 and the piston of cylinder C:2 is lowered.

It should be clear that the terminal post test probe assemblies 304 may be lowered at any of the five points on the "W" (FIG. 14), not just at Position "A"; the description above concerning when these probes are lowered is merely illustrative. It should be also clear that the terminal test probes need be lowered only once during the testing of a battery; this may be accomplished by positioning the rod 308 so that it is lifted by the jig plate only at Position "A."

Figure 7:
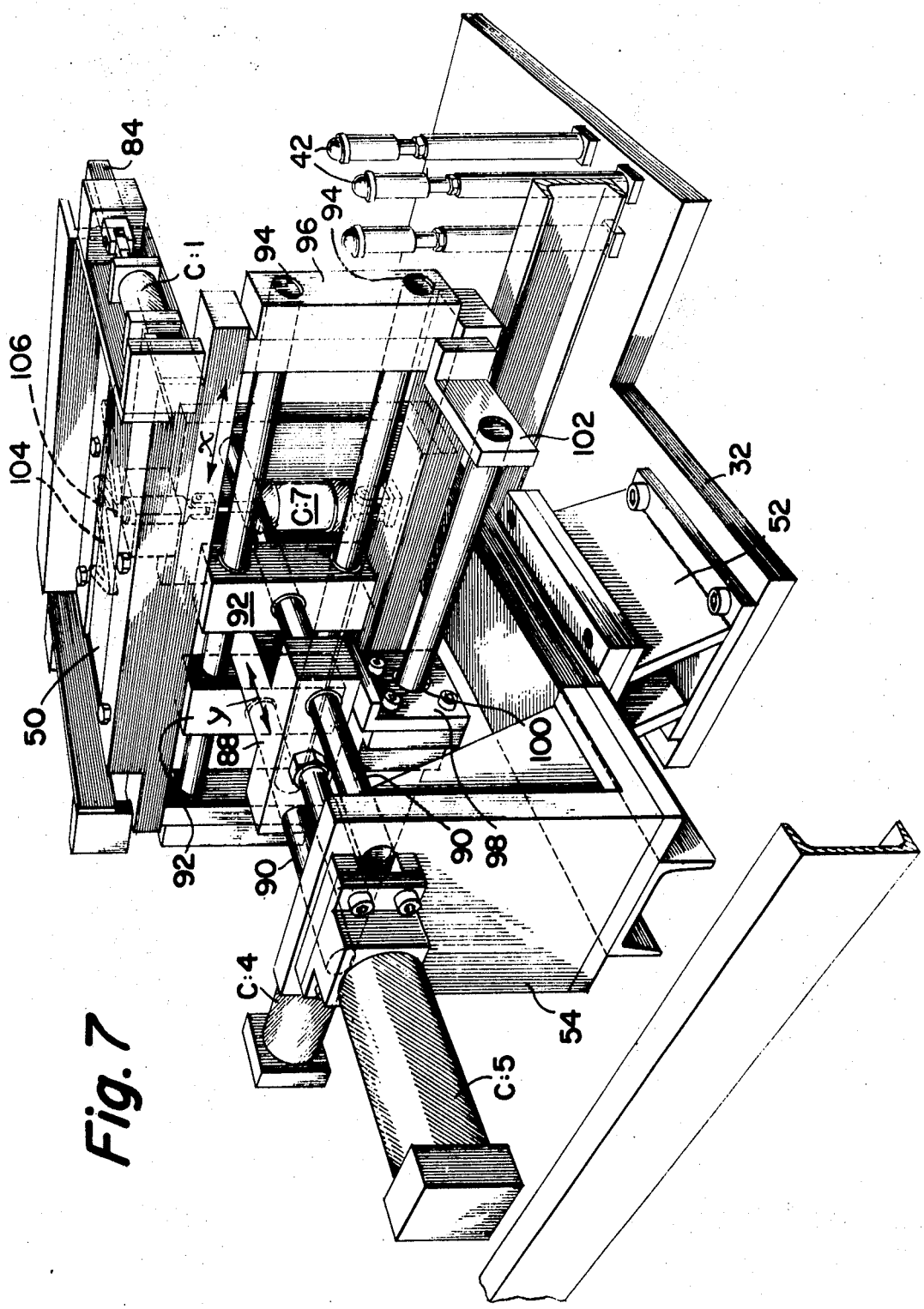
FIG. 7 is an oblique view of the mechanism which moves the battery horizontally between testing stations, looking from the rear of the machine toward the front.
Figure 9:
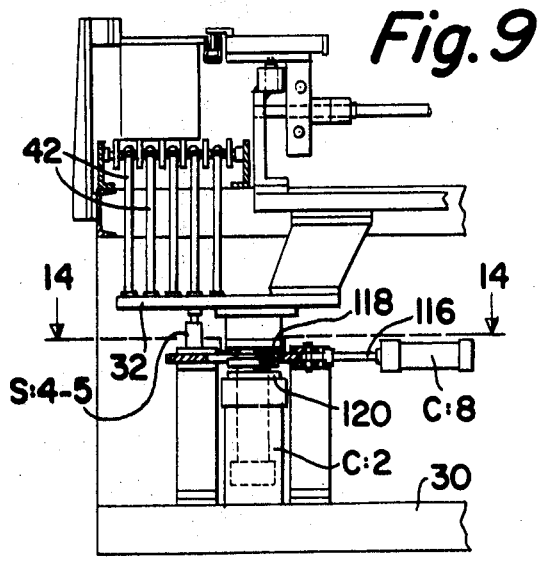
FIG. 9 is a side elevation of a portion of the bottom of the machine, showing the piston of the main lift cylinder lowered so that its collar is below a cutout in a horizontal key.
Figure 11:
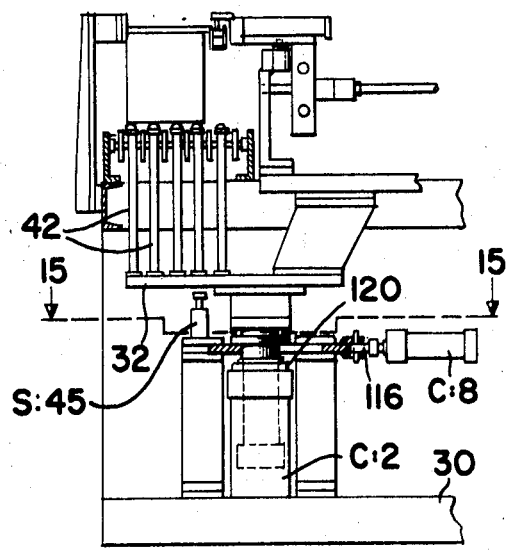
FIG. 11 is similar to FIGS. 9 and 10, but shows the piston lowered so that the collar rests upon the key.
Figure 10:
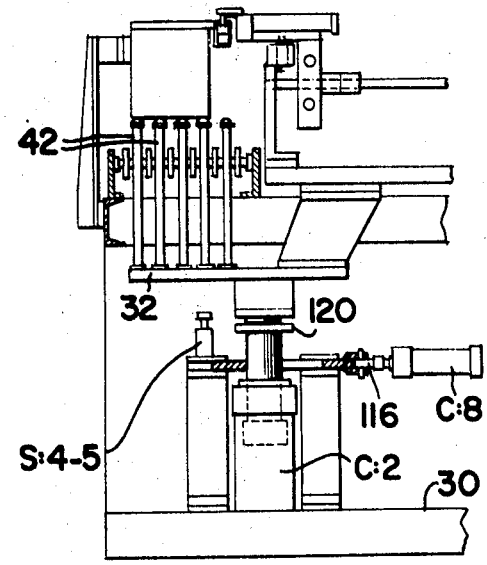
FIG. 10 is similar to FIG. 9, but shows the piston fully elevated and the collar above the key.

As the piston of cylinder C:2 lowers the battery, switch S:4-5 (located beneath table 32, as shown in FIGS. 9, 10, and 11) is triggered by the undersurface of table 32, causing two-way air cylinders C:4 and C:5 to function. As shown in FIG. 7, cylinder C:5, the one which causes the cam plate 50 to move in the "Y" direction is securely mounted in bracket 54, and the piston of cylinder C:5 acts against a block 88. Block 88 is free to slide along a pair of guide bars 90, and its motion is translated to tie blocks 92 through a projecting portion of block 88 which is rigidly connected to tie blocks 92. Thus tie blocks 92 may move in the "Y" direction, but not in the "X" direction.

FIG. 7 also shows a pair of guide bars 94 which extend through, and may slide with respect to, the tie blocks 92 in the "X" direction. The ends of bars 94 are secured in the vertical portions of a frame 96 which is constructed in the form of a rectangular loop; projecting outward from the top of this frame 96 is the cantilevered cam plate 50. Extending downward from the block 88 to which is is securely attached is a bracket 98; cylinder C:4, which is oriented in the "X" direction so as to produce motion of the cam plate 50 in the "X" direction, is in turn rigidly mounted on one side of bracket 98 so that its piston may slide freely through a hole 100 in bracket 98. The end of cylinder C:4's piston is rigidly affixed to a bracket 102 projecting outward from frame 96. From this it can be seen that when cylinder C:5 is activated, its piston causes bracket 102, frame 96, guide bars 94, and cam plate 50 to move simultaneously in the "X" direction with respect to the tie blocks 92.

From the proceeding it can be seen that frame 96 - to which cam plate 50 is secured - will move in the "Y" direction in response to the action of cylinder C:5 and in the "X" direction in response to the action cylinder C:4.

While the action of both cylinders C:4 and C:5 is initiated by the triggering of switch S:4-5, cylinder C:5 is activated after cylinder C:4; at Positions "B," "C," and "D" (see FIG. 14), this time delay is necessary or desirable to permit a cam guide 106 to move out of the peak at that position before cylinder C:5 is activated. When both cylinders C:4 and C:5 function, as they will when switch S:4-5 is triggered, cam plate 50 will move in the horizontal "X-Y" plane along a path which is predetermined by the shape of a groove 104 cut in the under side of cam plate 50. As is shown in FIG. 4, this groove 104 has the same "W" shape which appears in FIG. 14. The cam plate 50 is made to follow along this W-shaped path by reason of a cam guide 106 which, as can be seen in FIGS. 2 and 5, fits into the groove 104. The cam guide 106 is at the end of a linkage 108 which slides vertically through a block 110 affixed to the top of bracket 54; this block 110 permits vertical but not horizontal motion of the linkage 108, the motion being produced at the proper time by cylinder C:7 below.

SInce the cam plate must move in the "Y" direction both toward and away from the battery as it travels its W-shaped course, something must cause the two-way air cylinder C:5 to function in the proper direction. This is done by double-action switch S:5, which is located on the side of bracket 54 as shown in FIG. 8 and which is triggered each time the piston of cylinder C:5 reaches an extreme position of its movement. Thus, when switch S:5 is tripped in one direction, cylinder C:5 advances the cam plate in the "Y" direction toward the battery, while when switch S:5 is tripped the other way cylinder C:5 pulls the cam plate away from the battery. While one of the functions of switch S:4–5 is to cause cylinder C:5 to act at the right time, switch S:5 causes cylinder C:5 to act in the right direction.

When cylinder C:5 reaches the end of its stroke (when the cam plate has moved from Position "A" to Position "B" along its W-shaped path), the battery will be in position to have its second intercell connector tested. Something, however, must cause cylinder C:2, the main cylinder providing vertical motion to the table 32 and risers 42, to function and raise the battery up to the test probes. This is done by switch S:2, a double-action switch mounted on the top of bracket 54 (FIG. 8). An arm 108 extending upward from block 88 has two trips, 110 and 112, which engage switch S:2 as cylinder C:5 comes to the end of its stroke in either direction along the "Y" axis. Regardless of which way switch S:2 is tripped, it causes cylinder C:2 to function and lift the battery. A new cycle of the machine then begins, with switch S:3 being triggered when cylinder C:2 approaches the top of its stroke, causing one or more pulses to be sent through the probes 300 so that the suitability of the intercell connector at Position "B" may be determined. Successive cycles are repeated until the last of the five intercell connectors is tested.

After the last intercell connector is tested, at which time the cam plate will be at Position "E" along its W-shaped path, the table 32 once again begins to go down. During this descent switch S:6–7–8, mounted on frame 30 as shown in FIG. 8, is tripped by the downward motion of arm 114 which is attached to the cam plate 50. Tripping of switch S; 6–7–8 activates cylinders C:6, C:7, and C;8, thus causing several events to occur. First, cylinder C:6 is activated, retracting the stop pin 82 (FIG. 4) which in turn permits the constantly rotating belts 34 to carry the battery away from the machine as soon as the batter is lowered sufficiently. Secondly, since the cam plate is now ready to move from Position "E" back to Position "A" (FIG. 14) and there is no reason to travel backwards along the W-shaped path to get back to Position "A," cylinder C:7 is activated, retracting the cam guide 106 to which its piston is connected from the groove of the cam plate; the cam plate is then free to move along a straight line path back to Position "A". Cylinder C:8 is also activated when S:6–7–8 is triggered; however, that cylinder should be discussed separately.

Figure 13:
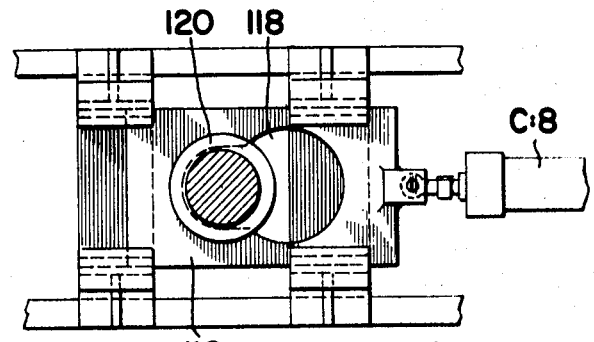
FIG. 13 is a plan view of the main lift cylinder and the key in the position shown in FIG. 11.
Figure 12:
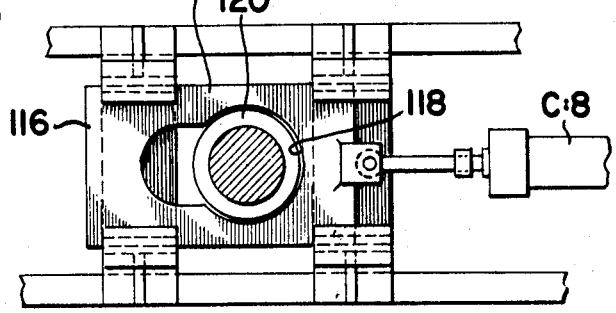
FIG. 12 is a plan view of the main lift cylinder and the key in the position in FIG. 9.

When the battery first advances onto the machine it is transported by the constantly rotating belts 34 and is lifted from the belts when cylinder C:2 first functions to raise the battery toward its first intercell connector test position. Although the battery must be lowered and raised again several more times before it is ready to be removed from the machine, there is no need for the battery to come down on the belts 34 since the necessary horizontal motion in the "X" direction will be transmitted to the battery through the cam plate and jig plate. Indeed, it is preferable for the battery not to be on the moving belts 34 until after the last intercell connector is tested, so that the machine does not have to overcome the force of the belts in order to prevent undesired motion to the battery in the "X" direction. With this in mind, attention is directed toward FIGS. 9 through 13, which show a slidable key 116 located in the center of the machine's frame 30 and beneath the table 32. See also FIGS. 1 through 3 for the location of this key. As shown in FIGS. 12 and 13, the key 116 has a cutout 118 in it. Both the larger and smaller portions of the cutout 118 are of sufficient size to accommodate the piston of cylinder C:2, but only the larger portion is of sufficient diameter to permit a collar 120 located on the piston of cylinder C:2 to go through the cutout 118. Horizontal sliding motion is provided to key 116 by the piston of two-way air cylinder C:8. Before a battery is received by the machine, the piston of cylinder C:2 is all the way down so that the collar 120 is below the key 116; at this time the larger portion of cutout 118 is directly above the collar. (In FIG. 9 the battery has been received, but has not yet been lifted. See also FIG. 12, a view taken at the same time as FIG. 9.) When the advancing battery triggers switch S:1–2–4–8, cylinder C:2 is activated, raising the battery. Following a suitable time delay sufficient to permit the collar 120 to raise up through the cutout in the key, cylinder C:8 is activated, moving the key horizontally (FIG. 10) so that when the piston of cylinder C:2 comes down later, the collar 120 will rest on top of the key (see FIG. 11); the piston of cylinder C:2 will go downward through the smaller portion of the cutout, but the collar will not (FIGS. 11 and 13). The vertical descent of the piston of cylinder C:2 will thus be limited. With the collar resting on the key, the test probes 300 will clear the top of the battery permitting the battery to be moved along its W-shaped path; at the same time, the battery remains sufficiently elevated so that it doesn't rest on the revolving belts 34. After the last intercell connector is tested, it is desirable to have cylinder C:8 function again in the reverse direction so that the collar will lower through the cutout in the key and so that the battery will be lowered to the revolving belts where it can be transported away from the machine. This last motion of cylinder C;8 is caused when switch S;6–7–8 is triggered.

The switch S:1–2–4–8 (see FIG. 8) whose arm 51 makes contact with the jig plate on top of the battery is released when the battery advances in the "X" direction away from the machine and the switch arm 51 drops off the back of the jig plate. When switch S:1–2–4–8 is so released, cylinder C:1 activates to retract shot pin 84 and simultaneously cylinder C:4 functions, returning the cam plate along a straight line path from position "E" to Position "A." When the cam plate reached Position "A," switch S:7–6 (FIG. 8) is triggered by an arm 122 mounted from and above block 88. This causes cylinders C:6 and C:7 to again function but in reverse direction to their previous motions so that the stop pin 82 again projects outward and the cam guide 106 is inserted into the W-shaped groove of the cam plate.

At this point the machine is finished with its work on one battery and is ready to receive another. The piston of cylinder C:2 is all the way down. The stop pin 82 is extended, while shot pin 84 is retracted. The cam plate is back to position "A", and the cam guide 16 is inserted into the groove of the cam plate.

It should now be apparent that the machine could easily be modified to test connectors for batteries having other than six cells, and using a cam plate having a groove other than W-shaped. The six automobile battery and the W-shaped cam plate groove described about have been described simply as one typical example in which the machine might find use.

We claim:

1. A machine used in electrically testing intercell connectors of multicell batteries, said multiple cells being separated by partitions with said connectors joining cells on either side of said partitions comprising:

a. a frame;

b. means supported by the frame for receiving the battery container;

c. an electrical test probe assembly supported by the frame, the probe assembly containing a pair of electrical probe members;
d. means supported by the frame for causing the probe assembly to come into engagement with an intercell connector so that one of the electrical probe members is in contact with an intercell connector on one side of a battery container partition while the other probe member is in contact with the same intercell connector on the other side of the same partition;
e. means for causing an electrical current to be passed between the pair of probe members while the probe members are in contact with the intercell connector; and,
f. means for measuring the magnitude of an electrical characteristic of the intercell connector when the electrical current is being passed between the pair of probe members.

2. The machine of claim 1 in which the means for causing the probe assembly to come into engagement with the intercell connector comprises:
a. means for moving the battery container horizontally to a point beneath the probe assembly; and,
b. means for elevating the battery container so that the intercell connector comes into engagement with the probe assembly.

3. The machine of claim 2 in which the means for moving the battery container horizontally comprise;
a. a cam plate supported by the frame;
b. means associated with the cam plate for securely engaging the battery container;
c. a cam guide in engagement with the cam plate; and,
d. means supported by the frame for causing the cam plate to move with respect to the cam guide.

4. The machine of claim 2 in which the means for elevating the battery container comprise:
a. a cylinder mounted in the frame and having a vertically movable piston therein;
b. a table mounted on the piston of the cylinder; and,
c. risers mounted on the table, the risers being arranged to elevate the battery container when the cylinder's piston lifts the table.

5. A machine used in electrically testing intercell connectors in a multicell battery, said multiple cells being separated by partitions with said connectors joining cells on either side of said partitions comprising:
a. a frame;
b. pulleys mounted in the frame;
c. belts engaging the pulleys for receiving the battery container;
d. a motor adapted to drive the pulleys and belts;
e. a cylinder mounted in the frame and having a vertically movable piston therein;
f. a table mounted on the piston of the cylinder;
g. risers mounted on the table and spaced between the belts and the pulleys;
h. a cam plate supported by and above the table;
i. means associated with the cam plate for securely engaging the battery container;
j. a cam guide in engagement with the cam plate;
k. means supported by the frame for causing the cam plate to move with respect to the cam guide; and,
l. an electrical test probe assembly supported by the frame, the probe assembly containing a pair of electrical probe members, in which the battery container is brought into position so that one of the electrical probe members is in contact with an intercell connector on one side of a battery container partition while the other probe member is in contact with the same intercell connector on the other side of the same partition by the combined movements of the cylinder piston and the means which causes the cam plate to move.

6. A machine used in electrically testing the connection of battery terminal posts to their respective connecting straps comprising:
a. a frame;
b. means supported by the frame for receiving a battery container;
c. an electrical test probe assembly supported by the frame, the probe assembly containing a pair of electrical probe members;
d. means supported by the frame for causing the probe assembly to come into engagement with the battery so that one of the electrical probe members is in contact with the battery terminal post and the other probe member is in with the connecting strap to which the terminal post is connected;
e. means for causing an electrical current to be passed between the pair of probe members while the probe members are in contact with the terminal post and the connecting strap; and,
f. means for measuring the magnitude of an electrical characteristic of the terminal post and its connection to the connecting strap when the electrical current is being passed between the pair of probe members.

7. The machine of claim 6 in which the means for causing the probe assembly to come into engagement with the battery terminal post and the connecting strap to which it is connected comprises:
a. means for moving the battery container horizontally to a point beneath the probe assembly; and,
b. means for elevating the battery container so that the terminal post and the connecting strap to which it is connected come into engagement with the probe assembly.

8. The machine of claim 6 in which the means for causing the probe assembly to come into engagement with the battery terminal post and the connecting strap to which the terminal post is connected comprises:
a. means for moving the battery container horizontally to a point beneath the probe assembly; and,
b. means for lowering the probe assembly so that one of the electrical probe members comes in contact with the terminal post and the other probe member comes in contact with the connecting strap to which the terminal post is connected.

9. The machine of claim 6 in which the means for causing the probe assembly to come into engagement with the battery terminal post and the connecting strap to which the terminal post is connected comprises:
a. means for moving the battery container horizontally to a point beneath the probe assembly; and,
b. means for then moving the probe assembly and battery vertically so that one of the electrical probe members comes in contact with the terminal post and the other probe member comes in contact with the connecting strap to which the terminal post is connected.

10. The machine of claim 7 in which the means for moving the battery container horizontally comprises:
a. a cam plate supported by the frame;
b. means associated with the cam plate for securely engaging the battery container;
c. a cam guide in engagement with cam plate; and,
d. means supported by the frame for causing the cam plate to move with respect to the cam guide.

11. The machine of claim 8 in which the means for moving the battery container horizontally comprise:
a. a cam plate supported by the frame;
b. means associated with the cam plate for securely engaging the battery container;
c. a cam guide in engagement with the cam plate; and,
d. means supported by frame for causing the cam plate to move with respect to the cam guide.

12. The machine of claim 9 in which the means for moving the battery container horizontally comprise:
a. a cam plate supported by the frame;
b. means associated with the cam plate for securely engaging the battery container;
c. a cam guide in engagement with the cam plate; and,
d. means supported by the frame for causing the cam plate to move with respect to the cam guide.

13. The machine of claim 7 in which the means for elevating the battery container comprise:
   a. a cylinder mounted in the frame and having a vertically movable piston therein;
   b. a table mounted on the piston of the cylinder; and,
   c. risers mounted on the table, the risers being arranged to elevate the battery container when the cylinder's piston lifts the table.

14. A machine used in electrically testing the connection of battery terminal posts to their respective connecting straps comprising:
   a. a frame;
   b. pulleys mounted in the frame;
   c. belts engaging the pulleys for receiving the batter container;
   d. a motor adapted to drive the pulleys and belts;
   e. a cylinder mounted in the frame and having a vertically movable piston therein;
   f. a table mounted on the piston of the cylinder;
   g. risers mounted on the table and spaced between the belts and the pulleys;
   h. a cam plate supported by and above the table;
   i. means associated with the cam plate for securely engaging the battery container;
   j. a cam guide in engagement with the cam plate;
   k. means supported by the frame for causing the cam plate to move with respect to the cam guide; and,
   l. an electrical test probe assembly supported by the frame, the probe assembly containing a pair of electrical probe members, in which the battery container is brought into position by the cylinder piston and the cam plate moving means so that one of the electrical probe members is in contact with the battery terminal post and the other probe member is in contact with the connecting strap to which the terminal post is connected.

15. A machine used in electrically testing the connection of intercell connectors of multicell batteries to their respective connecting straps comprising:
   a. a frame;
   b. means supported by the frame for receiving the battery container;
   c. an electrical test probe assembly supported by the frame, the probe assembly containing a pair of electrical probe members;
   d. means supported by the frame for causing the probe assembly to come into engagement with the battery so that one of the electrical probe members is in contact with an intercell connector while the other probe member is in contrast with one of the connecting straps to which the intercell connector is joined;
   e. means for causing an electrical current to be passed between the pair of probe members while the probe members are in contact with the intercell connector; and the connecting strap and
   f. means for measuring the magnitude of an electrical characteristic of the intercell connector and its connection to the connecting strap when the electrical current is being passed between the pair of probe members.

16. The machine of claim 15 in which the means for causing the probe assembly to come into engagement with the battery comprises:
   a. means for moving the battery container horizontally to a point beneath the probe assembly; and,
   b. means for elevating the battery so that the battery comes into engagement with the probe assembly.

17. The machine of claim 16 in which the means for moving the battery container horizontally comprises:
   a. a cam plate supported by the frame;
   b. means associated with the cam plate for securely engaging the battery container;
   c. a cam guide in engagement with the cam plate; and,
   d. means supported by the frame for causing the cam plate to move with respect to the cam guide.

18. The machine of claim 16 in which the means for elevating the battery container comprise:
   a. a cylinder mounted in the frame and having a vertically movable piston therein;
   b. a table mounted on the piston of the cylinder; and,
   c. risers mounted on the table, the risers being arranged to elevate the battery container when the cylinder's piston lifts the table.

19. A machine used in electrically testing the connection of intercell connectors in a battery to their respective connecting straps comprising:
   a. a frame;
   b. pulleys mounted in the frame;
   c. belts engaging the pulleys for receiving the battery container;
   d. a motor adapted to drive the pulleys and belts;
   e. a cylinder mounted in the frame and having a vertically movable piston therein;
   f. a table mounted on the piston of the cylinder;
   g. risers mounted on the table and spaced between the belts and the pulleys;
   h. a cam plate supported by and above the table;
   i. means associated with the cam plate for securely engaging the battery container;
   j. a cam guide in engagement with the cam plate;
   k. means supported by the frame for causing the cam plate to move with respect to the cam guide; and,
   l. an electrical test probe assembly supported by the frame, the probe assembly containing a pair of electrical probe members, in which the battery container is brought into engagement with the battery so that one of the electrical probe members is in contact with an intercell connector while the other probe member is in contact with one of the connecting straps to which the intercell connector is joined.